(12) United States Patent
Noonan et al.

(10) Patent No.: US 8,437,551 B2
(45) Date of Patent: May 7, 2013

(54) DEVICES AND METHODS FOR RESTORING LOW-RESOLUTION TEXT IMAGES

(75) Inventors: Joseph P. Noonan, Gloucester, MA (US); Prabahan Basu, Lexington, MA (US)

(73) Assignee: Tufts University, Medford, MA (US)

( * ) Notice: Subject to any disclaimer, the term of this patent is extended or adjusted under 35 U.S.C. 154(b) by 313 days.

(21) Appl. No.: 12/681,454

(22) PCT Filed: Oct. 6, 2008

(86) PCT No.: PCT/US2008/078943
§ 371 (c)(1),
(2), (4) Date: Apr. 2, 2010

(87) PCT Pub. No.: WO2009/046419
PCT Pub. Date: Apr. 9, 2009

(65) Prior Publication Data
US 2010/0208996 A1 Aug. 19, 2010

Related U.S. Application Data

(60) Provisional application No. 60/997,869, filed on Oct. 5, 2007.

(51) Int. Cl.
*G06K 9/34* (2006.01)
(52) U.S. Cl.
USPC ............................ 382/176; 382/173; 382/181
(58) Field of Classification Search .................. 382/173, 382/176, 177, 180, 181, 209, 217, 270, 300; 356/121; 375/240.12, 240.26; 250/208.1, 250/201.9; 348/250
See application file for complete search history.

(56) References Cited

U.S. PATENT DOCUMENTS

| | | | |
|---|---|---|---|
| 7,856,055 B2 * | 12/2010 | Zhou et al. | 375/240.12 |
| 2002/0131507 A1 | 9/2002 | Orhand et al. | |
| 2004/0017579 A1 | 1/2004 | Lim | |
| 2004/0105129 A1 | 6/2004 | Kawakami | |
| 2005/0162512 A1 | 7/2005 | Seakins | |

OTHER PUBLICATIONS

International Search Report dated Apr. 27, 2009 issued in corresponding International Application No. PCT/US2008/078943.

* cited by examiner

*Primary Examiner* — Anh Hong Do
(74) *Attorney, Agent, or Firm* — Lathrop & Gage LLP (57) ABSTRACT

A system that extracts text from an image includes a capture device that captures the image having a low resolution. An image segmentation subsystem partitions the image into image segments. An image restoration subsystem generates a resolution-expanded image from the image segments and negates degradation effects of the low-resolution image by transforming the image segments from a first domain to a second domain and deconvolving the transformed image segments in the second domain to determine parameters of the low-resolution image. A text recognition subsystem transforms the restored image data into computer readable text data based on the determined parameters.

21 Claims, 10 Drawing Sheets

DEVICES AND METHODS FOR RESTORING LOW-RESOLUTION TEXT IMAGES

RELATED APPLICATIONS

This application claims the benefit of U.S. Provisional Patent Application No. 60/997,869, filed Oct. 5, 2007, the content of which is incorporated herein by reference in its entirety.

BACKGROUND OF THE INVENTION

There is an ever-increasing need to recognize text in an image in applications such as video surveillance. These applications require a device that can sense and capture an image. For example, a charge-coupled device (CCD) is included in many imaging devices, such as cell phones and security cameras. However, several problems may occur due to low resolution CCD devices, since text can become degraded by blurring due to the distance of the document from the imaging device, poor resolution due to insufficient sensor outputs from the imaging device, and uncorrelated noise from a variety of sources, including, but not limited to, noise due to sensor behavior in low light environments. These degradations may be so great as to render the text contained within the image illegible.

Existing conventional methods are available for the restoration of text images. However, the conventional methods have several disadvantages. One such method includes subspace identification, for example, disclosed in D. Rajan and S. Chaudhuri, "Simultaneous estimation of superresolved scene and depth map from low resolution defocused observations," IEEE Transactions on Pattern Analysis and Machine Intelligence, vol. 25, no. 9, pp. 1102-17, September, 2003, and G. B. Giannakis, R. W. Heath, Jr, "Blind Identification of Multichannel FIR Blurs and Perfect Image Restoration," IEEE Transactions on Image Processing, vol. 9 no. 11 pp 1877-96, November, 2000, each incorporated herein by reference in its entirety, which characterizes blurring and recovers an original scene by exploiting multiple observations of the same scene. However, this approach is too slow for bulk processing. In addition, this approach requires multiple observations of the same scene, and is not usually available.

Another method includes clustering algorithms, for example, disclosed in M. Ozdil and F. Vural, "Optical character recognition without segmentation," Document Analysis and Recognition, 1997, Proceedings of the Fourth International Conference on, vol. 2, 18-20 Aug. 1997, pp. 483-486 vol. 2., incorporated herein by reference in its entirety, which creates an estimate of an original scene by averaging similar regions of an input image. However, this method is prone to clustering dissimilar regions, thus producing spurious estimates.

Another method includes alternating minimization based on statistical regularization, for example, disclosed in R. Schultz and R. Stevenson, "A baysian approach to image expansion for improved definition," IEEE Trans. Image Processing, vol. 3, no. 3, pp. 233-242, May 1994, G. Ayers and J. Dainty, "Iterative blind deconvolution method and its applications," Optical Letters, vol. 13, pp. 547-, 1988, P. D. Thouin and C. I. Chang, "A method for restoration of low resolution document images," International Journal on Document Analysis and Recognition, no. 2, pp. 200-210, 2000, and Y. L. You and M. Kaveh, "A regularization approach to joint blur identification and image restoration," IEEE Trans. Image Processing, vol. 5, pp. 416-28, March 1996, each incorporated herein by reference it its entirety. Alternating minimization based on statistical regularization exploits prior statistical information about the desired enhanced estimate. However, the assumed models on desired solutions are true in a limiting sense, and these models tend to be inadequate for small data sets such as single images.

Another method includes blind equalization techniques, for example, disclosed in D. Kundur, "Blind Deconvolution of Still Images using Recursive Inverse Filtering," Master's Thesis, University of Toronto, 1995, incorporated herein by reference in its entirety, which works by choosing a solution closest to some deterministic, not statistical, property of the desired solution. However, this method requires information that usually not available, and is too slow for bulk processing.

In addition, the conventional methods described herein are focused on low resolution scenarios geared towards improving machine readability (COR), and do not address blurring restoration.

Thus, there is a requirement for a system and method that provides a computationally inexpensive and statistically robust reconstruction of original text data without having to rely on information which may be imperfectly known or altogether unavailable to the system operator.

SUMMARY OF INVENTION

Accordingly, a feature of the present invention is to provide devices and methods for restoring low-resolution text images by producing as its output an enhanced image with more legible text by exploiting common geometric properties of written characters across many different languages.

In accordance with an aspect of the invention, a system that extracts text from an image comprises a capture device that captures the image having a low resolution; an image segmentation subsystem that partitions the image into image segments; an image restoration subsystem that generates a resolution-expanded image from the image segments and that negates degradation effects of the low-resolution image by transforming the image segments from a first domain to a second domain and deconvolving the transformed image segments in the second domain to determine parameters of the low-resolution image; and a text recognition subsystem that transforms the restored image data into computer readable text data based on the determined parameters.

In an embodiment, the image segmentation subsystem identifies text from the image segments.

In an embodiment, the image restoration subsystem negates the degradation effects of the low-resolution image by negating distorting effects of defocus and CCD sensor point spread function.

In an embodiment, the degradation of the low-resolution image is modeled by a defocus process and a low-resolution process.

In an embodiment, the capture device comprises a charge-coupled device.

In an embodiment, the image restoration subsystem includes a blind image restoration system.

In an embodiment, the blind image restoration system applies an iterative blind deconvolution (IBD) framework.

In an embodiment, the image restoration subsystem includes a Radon transform that transforms the image segments from the first domain to the second domain.

In an embodiment, the second domain is a Radon domain and the first domain is an image domain.

In an embodiment, the image restoration subsystem performs a de-averaging operation in the Radon domain to negate the degradation effects. In an embodiment, the deaveraging operation is performed in a Radon domain.

In an embodiment, the image restoration subsystem includes an inverse Radon transform that transforms the image segments from the second domain to the first domain.

In an embodiment, the determined parameters of the low-resolution image are deconvolved by applying a Mutual Information Minimization (MIM)-based model.

In an embodiment, the image restoration subsystem performs a de-blurring operation to negate the degradation effects using the Mutual Information Minimization (MIM)-based model.

In an embodiment, the image segmentation subsystem identifies image segments that do not correspond to whole characters by conforming with a holistic character recognition technique.

In an embodiment, the system restores images of non-cursive text.

In accordance with another aspect of the invention, a system that expands the resolution of a text image comprises a text segmentation subsystem that partitions the text image into characters; and a restoration subsystem comprising: a first transform subsystem that transforms the partitioned text image from an image domain into a Radon domain; an interpolator that linearly interpolates each column of the Radon domain image, a first deconvolution subsystem that deconvolves each column to estimate first parameters of the text image; an image expander that forms an expanded Radon domain image; a second transform subsystem that transforms the expanded Radon domain image into the image domain; an image slicer that slices the expanded image domain image to enforce a first constraint; a third transform subsystem that transforms the sliced image from the image domain into the Radon domain; a second deconvolution subsystem that estimates second parameters of the text image in the Radon domain; a fourth transform subsystem that transforms the expanded Radon domain image including the second parameters into the image domain; and an output that outputs the expanded image domain image as a restored text image.

In an embodiment, the first constraint is that the text image is bimodal.

In an embodiment, each column is deconvolved using estimated information in an assumed Gaussian channel.

In an embodiment, the expanded text image is stored, and wherein the second parameters are used as a prior estimate for a next text image.

In an embodiment, the system restores images of non-cursive text.

In accordance with another aspect of the invention, a method of extracting text from an image comprises capturing the image having a low resolution; partitioning the image into image segments; generating a restored, resolution-expanded image from the image segments and negating degradation effects of the low-resolution image by transforming the image segments from a first domain to a second domain and by deconvolving the transformed image segments in the second domain to determine parameters of the low-resolution image; and transforming the restored image data into computer readable text data based on the determined parameters.

In an embodiment, text is identified from the image segments.

In an embodiment, degradation effects of the low-resolution image are negated by negating distorting effects of defocus and CCD sensor point spread function.

In an embodiment, the degradation of the low-resolution image is modeled by a defocus process and a low-resolution process.

In an embodiment, generating the restored, resolution-expanded image comprises applying an iterative blind deconvolution (IBD) framework to the image segments.

In an embodiment, a Radon transform transforms the image segments from the first domain to the second domain.

In an embodiment, the second domain is a Radon domain and the first domain is an image domain.

In an embodiment, a de-averaging operation is performed in the Radon domain to negate the degradation effects.

In an embodiment, the de-averaging operation is performed in a Radon domain.

In an embodiment, an inverse Radon transform transforms the image segments from the second domain to the first domain.

In an embodiment, the determined parameters of the low-resolution image are deconvolved by applying a Mutual Information Minimization (MIM)-based model.

In an embodiment, the method further comprises performing a de-blurring operation to negate the degradation effects using the Mutual Information Minimization (MIM)-based model.

In an embodiment, the method further comprises identifying image segments that do not correspond to whole characters by conforming with a holistic character recognition technique.

In accordance with another aspect of the invention, a method of expanding the resolution of a text image comprises partitioning the text image into characters; transforming the partitioned text image from an image domain into a Radon domain; linearly interpolating each column of the Radon domain image; deconvolving each column by applying first determined parameters of the text image; forming an expanded Radon domain image; transforming the expanded Radon domain image into the image domain; slicing the expanded image to enforce a first constraint; transforming the sliced image from the image domain to the Radon domain; estimating second parameters of the text image in the Radon domain; transforming the expanded Radon domain image including the second parameters into the image domain; and outputting the expanded image domain image as a restored text image.

In an embodiment, the first constraint is that the image original text image is bimodal.

In an embodiment, each column is deconvolved using estimated information in an assumed Gaussian channel.

In an embodiment, the expanded text image is stored, and wherein the second parameters are used as a prior estimate for a next text image.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention.

DETAILED DESCRIPTION OF EMBODIMENTS

Hereinafter, embodiments of the present invention will be described with reference to the attached drawings.

It will be understood that, although the terms first, second, etc. are used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof To address the abovementioned limitations of the prior art, in particular, document restoration drawbacks, in an embodiment, a system is provided that expands the resolution of text images, the system having inputs that receive single instances of low resolution text images that must be restored and transformed into data readable text, and the system including segmentation and text recognition subsystems, and a robust restoration subsystem. The restoration subsystem creates a bimodal image which favors polygonal representations, consistent with the characteristics of scripts of most non-cursive languages. In an embodiment, the resolution-expanded image is generated by iteratively solving a non-linear optimization equation in the Radon domain with the imposition of image domain constraints.

With the recent prevalence of low resolution CCD devices, such as those found in cell phones and security cameras, there has been a renewed interest in the blind restoration problem, in which unknown inputs have to be estimated from observed outputs with only some knowledge about the statistical characteristics of the inputs, but without actual knowledge of the system model. Where text images are concerned, the problem becomes one of resolution expansion. An efficient solution to this problem is required for many applications, for example, applications that may be used in law enforcement. For example, accurate restorations would allow low resolution surveillance cameras to be used to identify and track the license plates of cars leaving the scene of a crime. In the context of surveillance, low resolution cameras, such as those found in many mobile phones, could be used to adequately capture the contents of a document.

The text extraction problem is a complicated one, requiring many different systems working in tandem. First, there is the problem of segmenting the captured image into frames which may be readily processed by the other parts of the system. Next, these frames must be restored using some approach which is robust enough to differences across scenes or capture device parameters. Finally, there needs to be a reliable means of transforming the restored image data into computer readable text data.

In an embodiment of the invention, a restoration subsystem is implemented that applies the Mutual Information Minimization (MIM) approach proposed by J. Noonan, "The Mutual Information Priniciple and Some of its Applications," Ph.D dissertation, Tufts University, 1973, and J. Noonan and B. Achour, "Iterative Minimization of Entropic Stabilizating Functions in Signal Restoration," in Acoustics, Speech, and Signal Processing, 1991, ICASSP-91, 1991 International Conference, 14-17 Apr. 1991, pp. 1737-1740 vol 3, each incorporated herein by reference in their entirety. In another embodiment, the restoration system is a blind image restoration system. The MIM approach takes a gradient descent-like approach to the nonlinear least squares problem and has the added benefit of yielding well structured solutions. While the approach demonstrates reasonable performance in the spatial domain, the approach can be considered in a domain more suited to exploiting the nature of MIM solutions.

Figure 1:
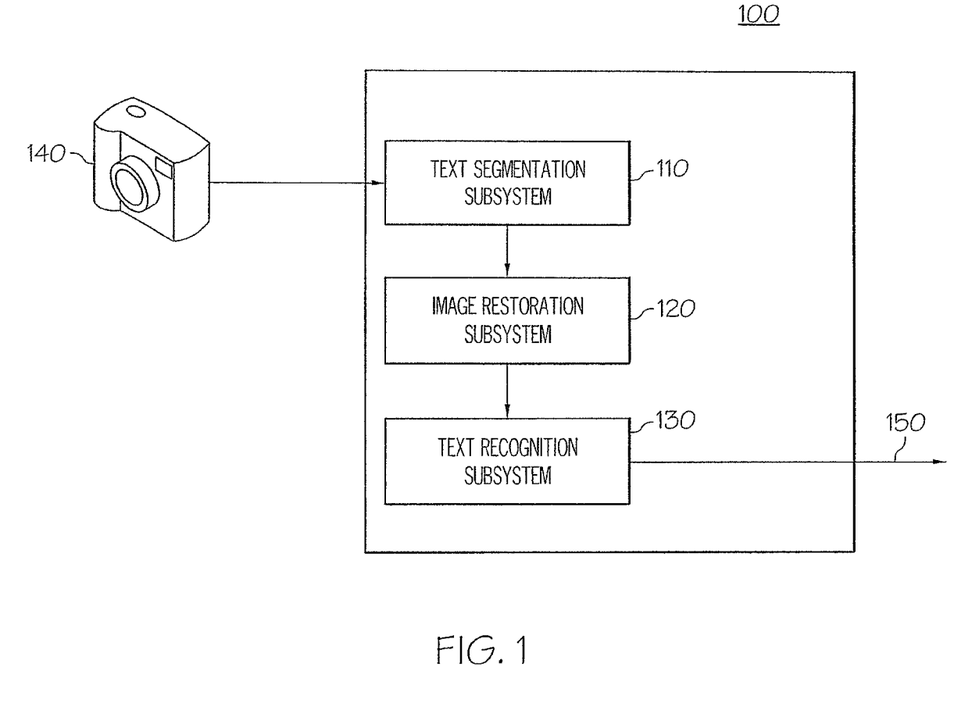
FIG. 1 is a schematic block diagram of a text extraction system according to embodiments of the present invention.

FIG. 1 is a schematic block diagram of a text extraction system 100 according to embodiments. As shown in FIG. 1, the text extraction system 100 includes a text image segmentation subsystem 110, an image restoration subsystem 120, also referred to as a blind restoration subsystem, and a text recognition subsystem 130, also referred to as a character recognition subsystem. The text extraction system 100 receives images from an image capture device 140, for example, a low resolution CCD, and segments the images into image segments or frames.

The text image segmentation subsystem 110 segments the captured image into frames, which are processed by the image restoration subsystem 120 and the text recognition subsystem 130. Image segmentation is a vital part of the text recognition system since character recognition systems generally rely on proper segmentation in order to accurately identify text using matched filtering schemes. Accordingly, the text extraction system 100 uses matched filtering schemes to accurately identify text in the received image.

The frames of the captured images are restored by the image restoration subsystem 120 using an approach that is sufficiently robust to restore the images, even if differences occur across scenes and sufficiently robust to capture device parameters. Thus, while the image restoration subsystem 120 requires that its input conforms to a set of specifications, the need for exact segmentation by the text image segmentation subsystem 110 is not required.

In an embodiment, a holistic strategy can be applied to the text extraction system 100 to identify image segments which do not necessarily correspond to whole characters, for example, as presented in M. Ozdil and F. Vural, "Optical Character Recognition Without Segmentation," in Document Analysis and Recognition, 1997, Proceedings of the Fourth International Conference on, vol. 2, 18-20 Aug. 1997, pp. 483-486, vol. 2, incorporated herein by reference in its entirety. In an embodiment, holistic character recognition techniques are applied to the text recognition subsystem. The holistic character recognition techniques permit a system designer to divorce a segmentation system, for example, text image segmentation system 110, from both the image restoration subsystem 120 and the text recognition subsystem 130 since the text image recognition subsystem 110 automatically chooses the optimal segmentation.

The text recognition subsystem 130 transforms the restored image data into computer readable data 150. In an embodiment, the text recognition subsystem comprises a set of filter banks (not shown) that are designed around a feature set describing text characters. The outputs of these filter banks inform the hypothesis test used to determine the character which corresponds to the specific input. Typically, the abovementioned subsystems are somewhat robust to noise in their inputs but may be sensitive to blurring. Accordingly, a deblurring method described below can be applied to the abovementioned subsystems.

Figure 2:
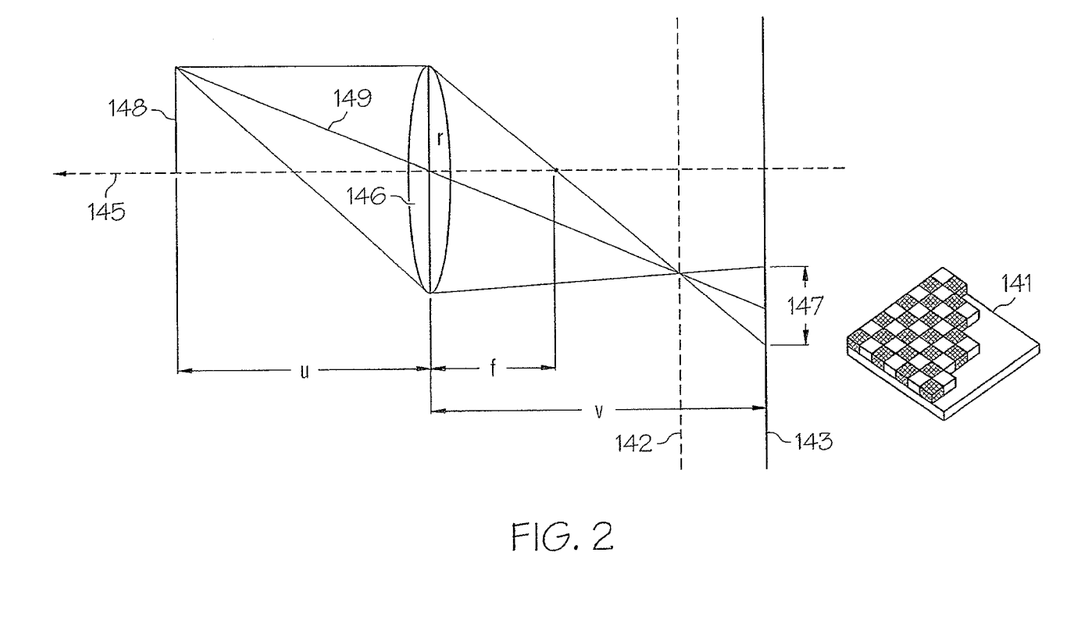
FIG. 2 is an illustration of a defocused image formation according to embodiments of the present invention.

FIG. 2 is an illustration of a defocused image formation according to embodiments of the present invention. As shown in FIG. 2, a low resolution out-of-focus image of text from a non-cursive script or font, e.g., Roman, Cyrillic, Kanji, etc. is provided to the capture device 140, or, as shown in FIG. 2, a sensor array 141 of the image capture device 140, wherein the text extraction system 100 recovers the original input image. As such, the problem addressed by embodiments of the invention is a blind single input single output (SISO) deconvolution problem with resolution expansion. Under this formulation, the degradation of the image to be restored by the text extraction system 100 can be modeled by two separate processes: defocus and low resolution.

Defocus refers to any departure 148 along the optical axis 145 from the point where the light rays of a captured object converge, at focusing plane 142. As FIG. 2 illustrates, this creates a circular blur 147 in the acquired image for each point source being captured. This circle can be defined by the blur parameter, given as Equation (1):

$$\sigma = prv\left(\frac{1}{f} - \frac{1}{v} - \frac{1}{u}\right) \quad (1)$$

where f is the focal length, u is the distance from the point source to the lens, v is the distance from the lens to the image plane 143 of the detector, r is the radius of the lens 146, and p is a constant depending on the optics of the capture device 140. See A. Pentland, "A new Sense for Depth of Field," IEEE Transactions on Pattern Analysis and Machine Intelligence, vol. 9, no. 4, pp. 523-531, July 1987. The defocus blur 147 is usually modeled by either a uniform intensity circle of radius $\sigma$ or a Gaussian spread function of variance $\sigma^2$. In an embodiment, the Gaussian blur case is applied, but the techniques presented here can easily be modified for the circular case. Thus, it is assumed that the form of the point spread function is given by Equation (2) as follows:

$$h(i, j) = \frac{1}{2\pi\sigma^2} e^{-\frac{i^2+j^2}{2\sigma^2}} \quad (2)$$

It is noted that, in the true blind case, the information required to calculate $\sigma$ in Equation 2 is unknown.

Having reached the image plane 143, the light rays 149 from the point source shown in FIG. 2 are captured by an array of sensors 141. As there is a limit to the number of sensors available to capture the image data, the acquired image must necessarily lose some of the information emitted from the source. One way to model this process, for example, according to approaches taken in R. Schultz and Stevenson, "A Baysian Approach to Image Expansion for Improved Definition," IEEE Trans. Image Processing, vol. 3, no. 3, pp. 233-242, May 1994, incorporated herein by reference in its entirety, is to define x as the original perfect resolution scene, the text image, captured at some tractable resolution. At the image plane 143, having gone through the blurring process described above, the high resolution blurred image is given by y=h*x+n. If the sensor array 141 is assumed to degrade this desired high resolution by some factor q, then the observed image will be given by $$Yd(i, j) = \frac{1}{q^2} \sum_{k=qi}^{(q+1)i-1} \sum_{l=qj}^{(q+1)j-1} y(k, l) \quad i, j = 1 \ldots N \quad (3)$$

Thus, the low resolution detection process can be thought of as the action of each sensor in the array 141 averaging $q^2$ pixels from the desired high resolution scene. If $Y_d$ is the $N^2 \times 1$ is the lexicographically ordered vector containing the pixel values from the N×N matrix yd, X is the lexicographically ordered high resolution scene, D is the decimation matrix and H is the blurring matrix, then Equation 3 is written as:

$$Y_d = DHX + n \quad (4)$$

where n is now the lexicographically ordered decimated noise process. The authors in D. Rajan and S. Chaudhuri, "Simultaneous Estimation of Super-resolved Scene and Depth Map from Low Resolution Defocused Observations," IEEE Transactions on Pattern Analysis and Machine Intelligence, vol. 25, no. 9, pp. 1102-17, September 2003, incorporated herein by reference in its entirety, point out that if the decimation matrix could commute with the blurring matrix then Equation 4 could be re-expressed as $$Y_d = HDX + n \quad (5)$$

thus effectively reducing the size of H and decreasing the complexity required in computing it. However, as the two matrices may not always commute, Equation 4 can be assumed in the foregoing calculations.

A goal of the present invention is to expand the resolution of a given observed low resolution image and to negate the distorting effects of defocus and the CCD sensor point spread function (PSF), which can be performed at least by the image restoration subsystem 120 shown in FIG. 1. However, for any given image there are an uncountable number of super-resolution images that fit the observed data (low-resolution image or images), referred to as a super resolution problem. As such, the resolution expansion problem falls into the general class of ill-posed inverse problems, wherein a source of information (high-resolution image) is estimated from observed data (low-resolution image or images). Blind convolution is a technique which permits recovery of the target object from one or more "blurred" images in the presence of a poorly determined or unknown point spread function (PSF).

Figure 5:
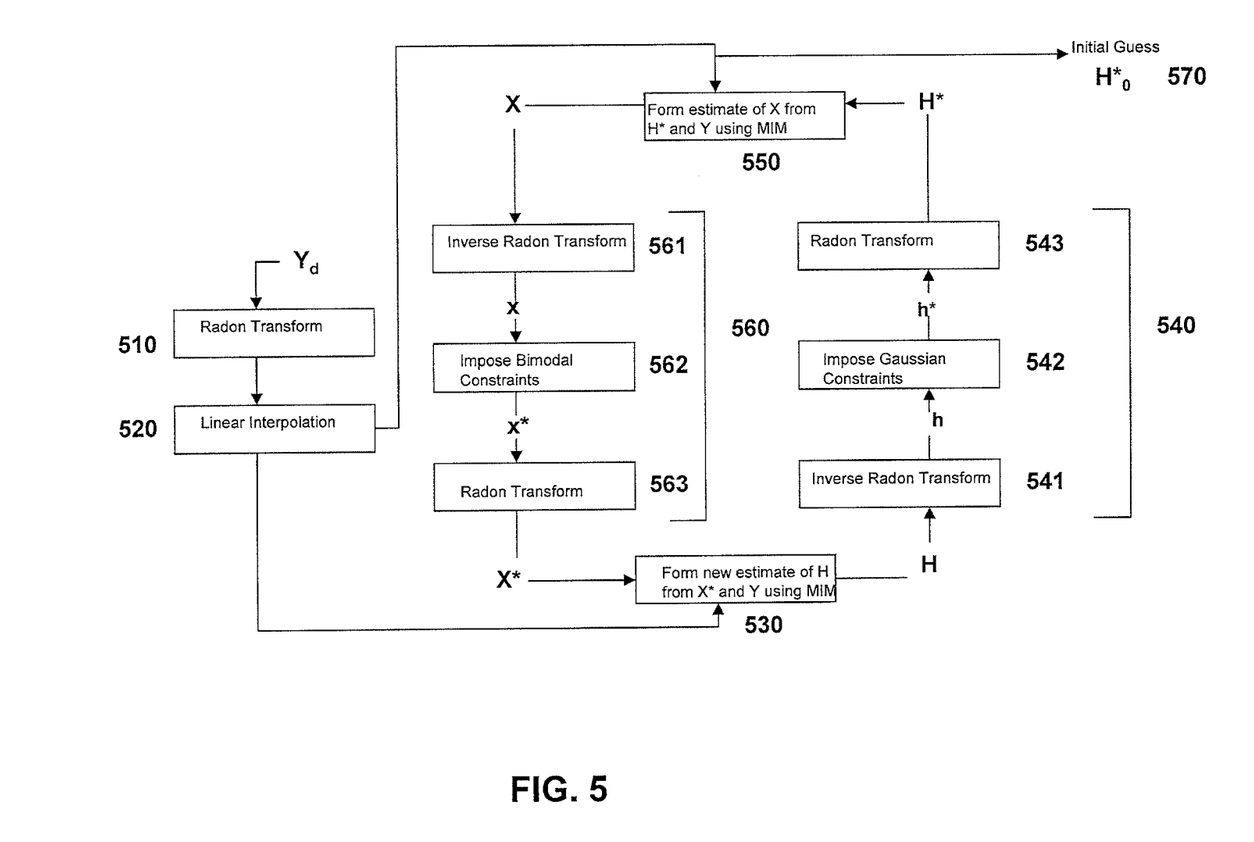
FIG. 5 is a flow diagram of a super-resolution approach, according to embodiments of the present invention.

Under the model assumptions described above, an embodiment of the present invention includes an approach to the super resolution problem, for example, illustrated in FIG. 5, motivated by an iterative blind deconvolution (IBD) framework, proposed in G. Ayers and J. Dainty, "Iterative blind deconvolution method and its applications," Optical Letters, vol. 13, p. 547, 1988, incorporated by reference above, which is introduced as an alternating minimization blind deconvolution approach which alternates between constraints in the Fourier domain and the image domain, for example, illustrated in FIG. 3.

Figure 3:
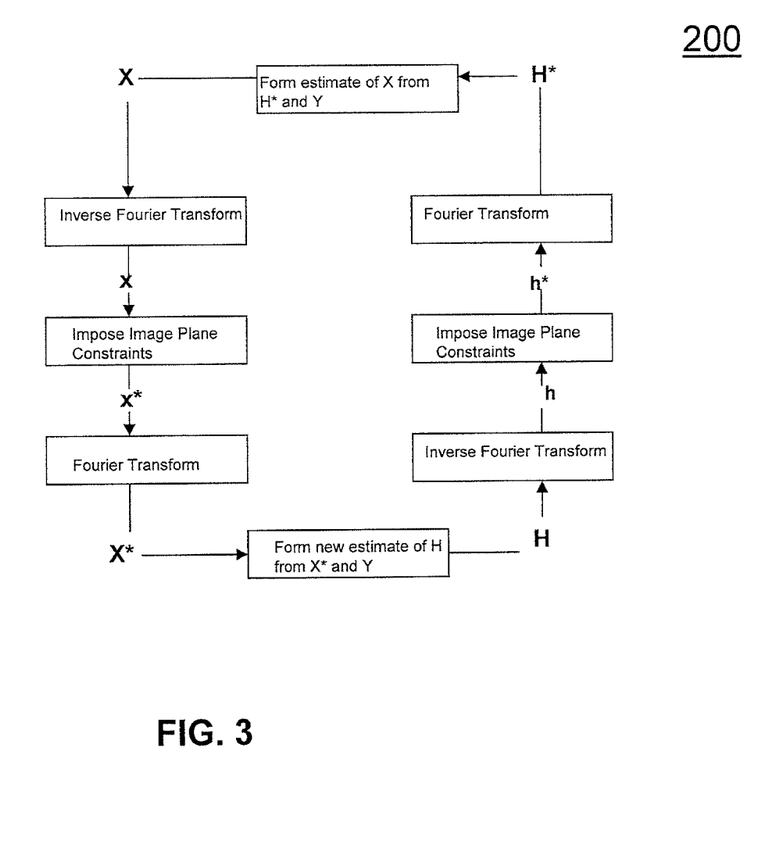
FIG. 3 is a flowchart of an iterative blind deconvolution (IBD) technique according to embodiments of the present invention.

FIG. 3 is a flowchart of an iterative blind deconvolution (IBD) technique 200 according to embodiments of the present invention. As shown in FIG. 3, (IBD) technique 200 alternates between constraints in the Fourier domain and the image domain. In particular, the IBD technique 200 illustrated in the flowchart of FIG. 3 pertains to, for an observed image, y=h*x+n, where x denotes the image, h denotes the blurring kernel, and n denotes added Gaussian noise. In an embodiment, the image restoration subsystem 120 shown in FIG. 1 comprises a blind image restoration subsystem, which can apply the IBD technique 200 shown in FIG. 3.

A. Components of the Approach

In an embodiment, an approach can be taken whereby the IBD technique described herein can be modified to exploit certain properties of a deconvolution algorithm, for example, a MIM algorithm proposed by Noonan, et al in J. Noonan, "The Mutual Information Principle and Some of its Applications," Ph.D dissertation, Tufts University, 1973, and J. Noonan and B. Achour "Iterative Minimization of Entropic Stabilizating Functions in Signal Restoration," in Acoustics, Speech, and Signal Processing, 1991, ICASSP-91, 1991 International Conference, 14-17 Apr. 1991, pp. 1737-1740 vol 3, P. Patarajan and J. Noonan, "A General Formulation for Iterative Restoration Methods," IEEE Transactions on Signal Processing, vol. 45, no. 10, 1997, B. Achour, "Regularization Theory in Signal Restoration—An Information Theoretic Approach," Ph.D. dissertation, Tufts University, 1991, and J. R. Marcus, "The Mutual Information Principle in Signal Restoration," Ph.D. dissertation, Tufts University, 1988, each incorporated herein by reference in its entirety, among other works.

The major components of the abovementioned approach are as follows:

1) The Radon Transform: One of the problems with blind deconvolution techniques, such as SISO blind deconvolution techniques, especially in comparison to multi-input single output (MISO) deconvolution problems, is the relative sparsity of available information with which to regularize the two underlying ill posed problems contained in the degradation model shown in Equation 4. Ideally, since the image domain offers little a priori information, it is preferable to find some transformation of the image which gives each admissible solution, i.e., the spacing of non-cursive letter images, which is a common characteristic. To achieve this, based on empirical images, a transform, such as the Radon transform, is preferred. The Radon transform is given by:

$$x_r(\rho,\theta)=\iint x(\alpha,\beta)\delta(\rho-\alpha\cos\theta-\beta\sin\theta)d\alpha d\beta \quad (6)$$

in the continuous case, and $$x_r(\rho, \theta) = \sum_\alpha \sum_\beta x(\alpha, \beta)\delta(\rho - \alpha\cos\theta - \beta\sin\theta) \quad (7)$$

where $\rho=1, \ldots, N$, $\theta=0, \ldots, 179$ for the discrete case. The Radon transform takes lines in the spatial domain and maps them to points in the Radon domain, thus exploiting the fact that the non-cursive alphabet consists of many letters which can be modeled as a union of straight lines.

Figure 4:
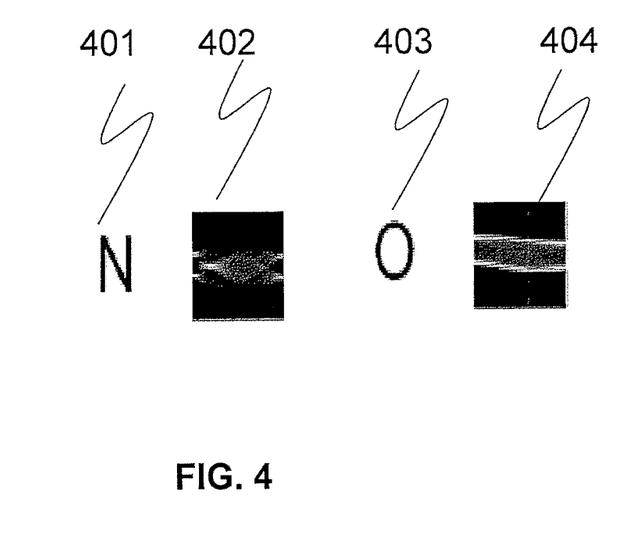
FIG. 4 illustrates a Radon transform of the letters O and N demonstrating the "peakiness" of the transform on Roman letters, the images being inverted in the Radon domain for clarity.

As FIG. 4 demonstrates, the Radon transform is a sufficiently peaky transforms 402, 404 for characters, such as Roman letters "O" 401 and "N" 403, respectively. For curved letters, such as the letter "O" 403, the Radon domain maintains this peakiness, albeit only in the vertical plane, which is not an obstacle with regard to the embodiments described herein.

One potential drawback of working in the Radon domain is that the transform of a whole word is not necessarily compacted in nature. In an embodiment, this issue is addressed by partitioning the text document into letter sized chunks or portions, which, in an embodiment, can be performed by the text segmentation subsystem 110 shown in FIG. 1 and then each of these chunks or portions individually, which, in an embodiment, can be performed by the restoration subsystem 120 shown in FIG. 1. A key result relating to the Radon transform is due to the projection slice theorem. It implies that the Radon transform of the two-dimensional convolution of two functions is equal to the one-dimensional convolution of their Radon transforms.

Thus, for a fixed $\theta_0$ and for some unknown H:

$$R_Y(\rho,\theta_0)=R_X(\rho,\theta_0)*R_H(\rho,\theta_0) \quad (8)$$

where $R_X(\rho, \theta_0)$ denotes the Radon transform vector of x at angle $\theta_0$. If the channel is rotationally invariant, the equation above becomes:

$$R_H(\rho,\theta_i)=R_H(\rho,\theta_j) \; \forall \theta_i,\theta_j \in \vec{\Theta} \quad (9)$$

The advantages of the structure present in the Radon transform of letter images are two-fold. First, consider the de-averaging problem. In the image domain, the de-averaging process necessarily involves some sort of interpolation. While there are sophisticated interpolation schemes for de-averaging text images, for example, described in Thouin, P. D. and Chang, C.-I., "A Method for Restoration of Flow Resolution Document Images," International Journal on Document Analysis and Recognitition, No. 2, pp. 200-210, 2000, incorporated herein in its entirety by reference, a preferred approach, linear interpolation, offers little in the way of resolution improvement. However, in the Radon domain, applying linear interpolation, for example, as shown in FIG. 5, step 520, produces much better results since the text images will have an underlying exploitable structure. Second, as described herein, the low entropy characteristic of Radon transformed text images can also be used when regularizing the ill posed deconvolution problem arising from undoing the effects of the point spread function.

2) MIM Algorithm: A second component in the abovementioned approach is a MIM algorithm, which, in an embodiment, can be implemented in the restoration subsystem 120. In an embodiment, the model given in Equation 4 consists of an averaging operation and a blurring operation. For the restoration approach according to an embodiment of the present invention, these distortion effects are separately undone. However, the present invention also leverages characteristics of each solution in solving the dual problem. In an embodiment, the de-averaging problem is addressed by applying the previously described Radon transform. In an embodiment, the problem of de-blurring is addressed using the aforementioned MIM algorithm.

After expanding the image in the Radon domain, if one assumes a de-averaged estimate $\hat{Y}_0$ in Equation 4, the problem becomes:

$$\text{Solve for } X_\theta \text{ in } Y_\theta=HX_\theta+n \quad (10)$$

where $X_\theta$ and $Y_\theta$ are the vectors corresponding to the Radon transform at angle $\theta$. The form of Equation 10 is the well known one dimensional ill posed inverse problem over each angle in the Radon domain. The problem is ill posed because the addition of noise in the model precludes the existence of a unique solution. In an embodiment, the Radon transform of non-cursive letters tend to have low entropy. To this end, in an embodiment, a regularization of the inverse problem is proposed due to Noonan et al which uses mutual information. The effect of this regularization is to choose a solution with reduced entropy. The corresponding regularized deconvolution cost function using this algorithm is given by:

$$\arg \min_{p(y|x)} |y - h * p(x)|^2 + \lambda \sum p(x)p(y|x)\frac{p(y|x)}{p(y)} \quad (11)$$

where the minimization occurs over the conditional density and $p(x)=\acute{\emptyset}(x)$. The parameter $\lambda$ is dependent on the known noise power. $p(x)=\acute{\emptyset}(x)$ is found by using the equality $$p(x) = \sum_y p(y|x)p(x) \quad (12)$$

The invertible mapping function $\acute{\emptyset}$ takes the estimate and scales it so that it obeys the properties of a probability density function. For the purposes of this work it is assumed that the mapping function is of the form $$\phi(x_\theta) = \frac{x_\theta}{\sum x_\theta} \quad (13)$$

However, in other embodiments, other mapping functions are possible. A full treatment of such mapping function generalizations and their consequences may be found in B. Achour, "Regularization Theory in Signal Restoration—An Information Theoretic Approach," Ph.D. dissertation, Tufts University, 1991 and J. R. Marcus, "The Mutual Information Principle in Signal Restoration," Ph.D. dissertation, Tufts University, 1988, incorporated by reference above. An equivalent formulation of the cost function, Equation 11, is given by:

$$\min_{P(x)} |y - h * p(x)|^2 + \sum p(x)\ln\frac{p(x)}{p(y)} \quad (14)$$

Both the objective functions in Equations (11) and (14) produce the following iterative solution for the estimate of the original image $f$. Under certain fairly non-stringent conditions, it can be shown that the convergence of this iterative procedure is guaranteed as a consequence of the contraction mapping principle:

$$x_{n+1} = Ke^{\lambda(y-h*x)*h_f} \quad (15)$$

where in one dimension $h_f$ is the flipped version of the channel h, and in two dimensions is simply the transpose. The advantages of multiplicative update schemes, like the one given in Equation 15 for iterative least squares solutions is discussed in Y. Lin and D. D. Lee, Bayesian Regularization and Nonnegative Deconvolution for Room Impulse Response Estimation," IEEE Transactions on Signal Processing, vol. 54, no. 3, pp. 839-847, March 2006, incorporated herein by reference in its entirety. Here, it suffices to note that multiplicative updates provide an inherent positivity constraint on the derived least squares solution. Finally, it has been noted in J. R. Marcus, "The Mutual Information Principle in Signal Restoration," Ph.D. dissertation, Tufts University, 1988, incorporated by reference above, that this algorithm, in addition to the characteristics mentioned above, also has good noise suppression properties. The following describes how this property may be exploited to address both the resolution expansion and deconvolution problems.

B. Super-resolution and De-blurring Algorithm

Having described the requisite components for modifying the abovementioned IBD technique, an approach to solving the SISO super-resolution problem will now be described.

FIG. 5 is a flow diagram of a super-resolution approach, according to embodiments of the present invention. This approach or procedure that addresses the abovementioned resolution expansion and deconvolution problems closely resembles the IBD alternating minimization approach described above. In an embodiment, the approach shown in FIG. 5 can be performed by the image restoration subsystem 120 shown in FIG. 1. In an embodiment, Equation 4 can be decomposed into two ill posed inverse problems, namely to solve for Y in:

$$Y_d = DY \quad (16)$$

and to solve for X in $$Y = HX + n \quad (17)$$

In an embodiment, a text image is partitioned into characters, for example, using the text segmentation subsystem 110. While this process is not straightforward, the resulting acquired image is of sufficient resolution whereby partitioning the image can be performed without much difficulty. Next, with regard to Equation 16, and as shown in step 510, the partitioned letter image is transformed into the Radon domain using Equation 9. For an N×N image, this produces a N×180 size Radon image. Next, as shown in step 520, each column of the Radon image is linearly interpolated by a factor of q corresponding to the desired resolution improvement in the image.

This procedure alone does not produce a valid approximation for the high resolution blurred scene Y. However, as shown in steps 530 and 540, each column is deconvulved with the MIM algorithm using some guess for σ in the assumed Gaussian channel. The effect of this is to both smooth the low Radon intensity values of the Radon angle vector and to sharpen the peaks in the data. Thus, the image restoration subsystem 120 can use a deconvolution algorithm to solve the inverse problem in Equation 17 and also refine the solution of the inverse problem in Equation 16.

Next, as shown in steps 550 and 560, the expanded Radon domain image is transformed back into the image domain. At this point, as shown in steps 561-563, the image is sliced so as to enforce the constraint that the image original text image is bimodal. This image, then, is our initial estimate for x. However, this estimate is derived using an uninformed guess 570 for the channel. Therefore, following the IBD framework, this image is transformed into the Radon domain and the MIM deconvolution algorithm is reapplied (see step 530), this time solving for the channel H in the Radon domain (see steps 541-543). After transforming the channel estimate back to the image domain (see steps 550, 560), the Gaussian constraint is enforced on the channel by performing a nonlinear least squares Gaussian fit on this channel estimate (see step 542). Finally, upon convergence, the image block is stored and the channel is used as the prior guess for the next letter image. To reiterate, then, even though linear interpolation 520 is only being performed once, the solutions of both inverse problems in Equations 16 and 17 are iteratively refined through this procedure.

Figure 6:
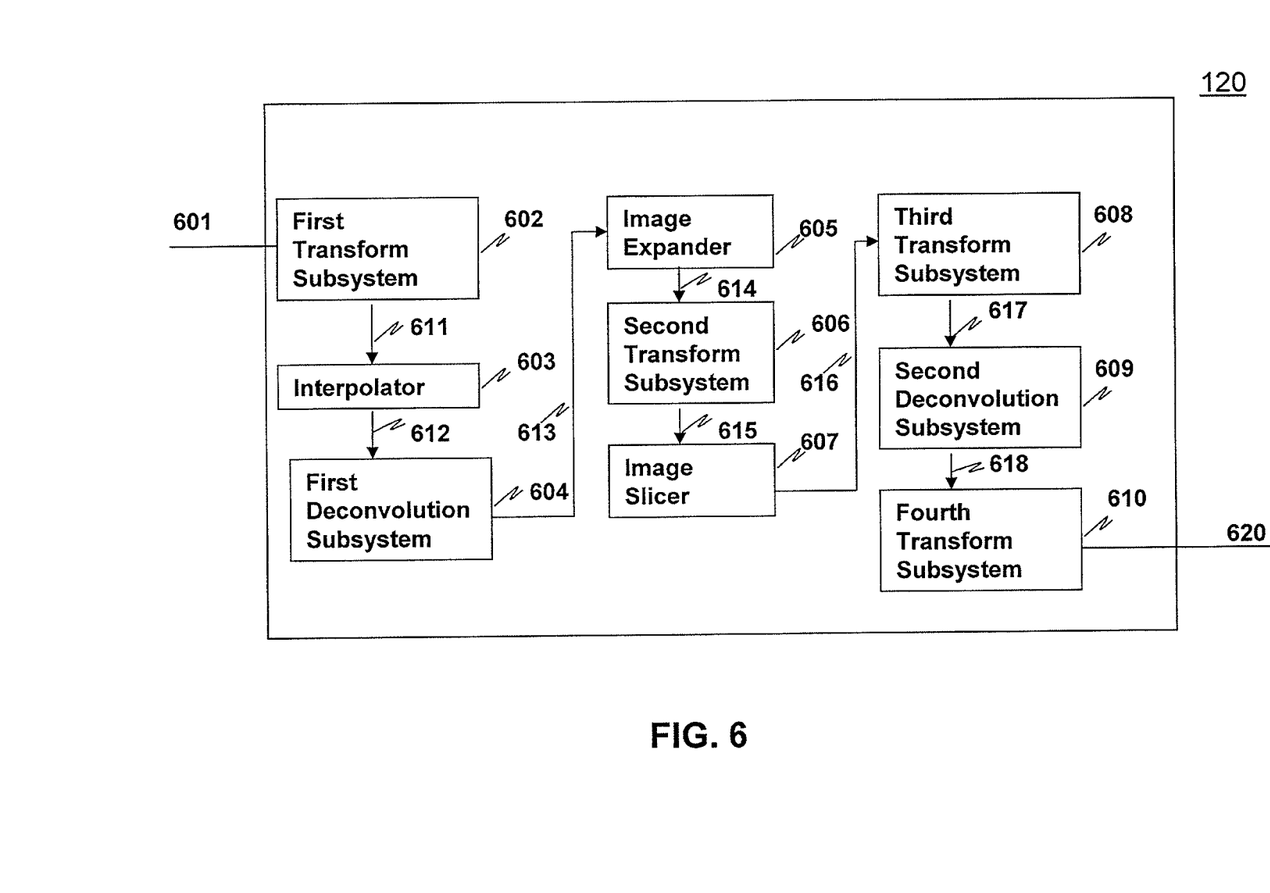
FIG. 6 is a schematic block diagram of the image restoration subsystem shown in FIG. 1 according to embodiments of the present invention.

FIG. 6 is a schematic block diagram of the image restoration subsystem 120 shown in FIG. 1 according to embodiments of the present invention. The image restoration subsystem 120 comprises a first transform subsystem 602, an interpolator 603, a first deconvolution subsystem 604, an image expander 605, a second transform subsystem 606, an image slicer 607, a third transform subsystem 608, a second deconvolution subsystem 609, and a fourth transform subsystem 610.

The first transform subsystem 602 transforms a partitioned text image 601 from an image domain into a Radon domain and outputs a Radon domain image 611. In an embodiment, the text image 601 is partitioned into characters by a text segmentation subsystem, such as the text segmentation subsystem 110 shown in FIG. 1. In an embodiment, the first transform subsystem 602 uses equation (7) to transform the partitioned text image 601 from the image domain into the Radon domain.

The interpolator 603 linearly interpolates the Radon domain image 611. In an embodiment, the Radon domain image 611 comprises a plurality of columns, wherein the interpolator 603 linearly interpolates each column of the Radon domain image 611.

The first deconvolution subsystem 604 deconvolves the interpolated columns 612 to estimate first parameters of the text image 601. In an embodiment, the first deconvolution subsystem 604 applies deconvolution techniques described herein for example, the abovementioned MIM technique, to deconvolve the interpolated columns 612.

The image expander 605 receives the deconvulved image 613 from the first deconvolution subsystem 604 and expands the image 613 in the Radon domain.

The second transform subsystem 606 transforms the expanded Radon domain image 614 into the image domain.

The image slicer 607 slices the expanded image domain image 615 to enforce a constraint. In an embodiment, the constraint is that the original text image is bimodal, which is preferable since a bimodal image favors polygonal representations, which are consistent with the characteristics of scripts of most non-cursive languages.

The third transform subsystem 608 receives the sliced image 616 and transforms the sliced image 616 from the image domain into the Radon domain. In an embodiment, the third transform subsystem 608 transforms the sliced image 616 from the image domain into the Radon domain after applying an IBD technique to the text image.

The second deconvolution subsystem 609 receives the text image in the Radon domain 617 and estimates second parameters of the text image, for example, based on an estimate of x and solving for a channel H in the Radon domain described above with regard to equations (16) and (17).

The fourth transform subsystem 610 receives the channel estimate, and transforms the channel estimate 618 into the image domain. After the channel estimate 618 is transformed from the Radon domain into the image domain, a constraint, such as a Gaussian constraint, can be enforced on the channel 620. In an embodiment, the Gaussian constraint is enforced by performing a nonlinear least squares Gaussian fit on the channel estimate. In an embodiment, the channel 620 is output as an expanded text image, which can be stored. In an embodiment, the channel 620 can be used as a prior guess for a subsequent text or character image, such as a letter image.

Figure 7:
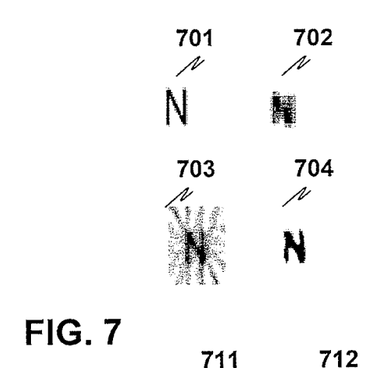
FIGS. 7-13 are illustrations of restored text images, according to embodiments of the present invention.
Figure 8:
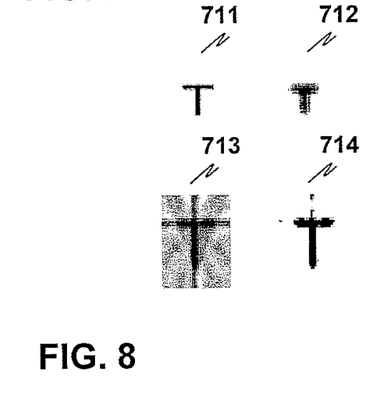
Figure 9:
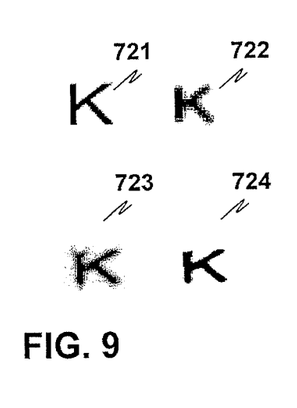
Figure 10:
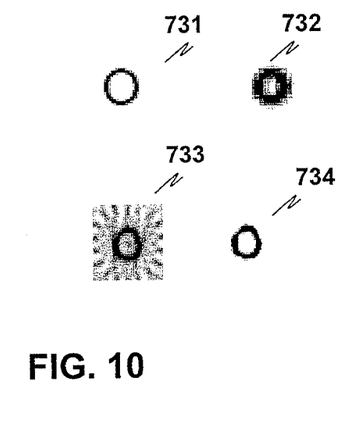

FIGS. 7-13 are illustrations of restored text images, according to embodiments of the present invention. In particular, the performance of the systems and methods described herein are tested with images of various English letters shown in in FIGS. 7-13. Original images 701, 711, 721, 731, 741, 751, 761 shown in FIGS. 7-13, respectively, are blurred by a Gaussian point spread function with a variance equal to half the length of the letter, for example, letters, 702, 712, 722, 732, 742, 752, 762. In the original high resolution scene, the letter image is assumed to be 32×32. After the blurring process, the images were down-sampled by a factor of 8. The images are then partitioned to isolate single letters. As expected, as shown in FIGS. 7-9, degraded images of letters which consist primarily of lines are restored with this technique, as shown with letters 704, 714, 724. However, the technique works equally well with curved letters, as can be seen in FIG. 10, letter 734.

Figure 11:
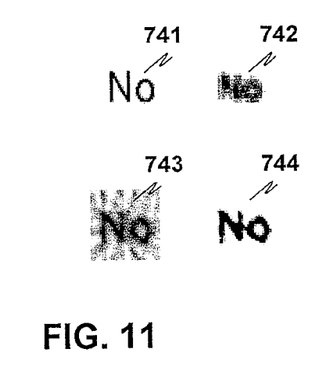

It bears noting that it may be difficult to accurately isolate single letters during the partitioning process, as shown in FIG. 11, letters 741-744. As a result, the performance of the approach can be evaluated in these cases where more than one letter is present in the partitioned image. One such case is shown in FIG. 11, which demonstrates the performance of the text extraction system described herein and the schemes, approaches, methods, and algorithms described herein is adequate in these situations.

Figure 12:
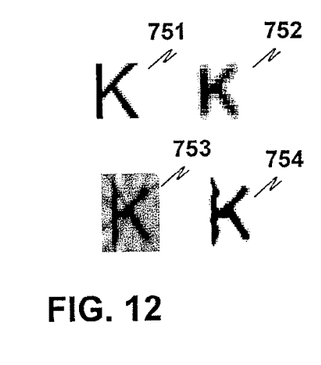
Figure 13:
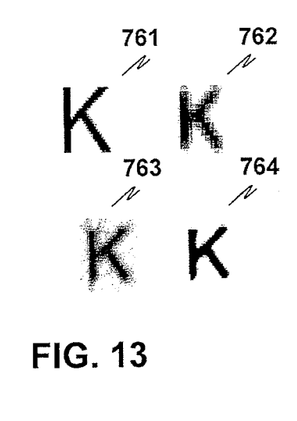

Finally, the speed of the systems and methods of the present invention can be greatly increased by reducing the number of angles computed in the Radon transform. In Equation 7, θ can be restricted to some smaller set of angles within $[0,\pi)$. For example, FIG. 12 shows the result of applying the fast alternating minimization approach described herein over 10 equally spaced points along the interval $[0,p)$, while FIG. 13 shows the result of applying the approach over 20 equally spaced points.

Described herein is a fast alternating minimization approach based on the iterative blind deconvolution framework which can blindly restore images of non-cursive text. By exploiting the properties of the Radon transform, it is shown that a minimum entropy type restoration approach can be used to perform both de-averaging and de-blurring. Furthermore, it is shown that the approach of the invention can be easily sped up without sacrificing accuracy.

Finally, in an embodiment, only a bimodal measure is used to evaluate the quality of the iterative restoration. Instead, if a combined measure similar that described in Thouin, P. D. and Chang, C.-I., "A Method for Restoration of Flow Resolution Document Images," International Journal on Document Analysis and Recognitition, No. 2, pp. 200-210, 2000, incorporated herein by reference in its entirety, was applied instead, where smoothness and adherence to the low resolution input are also evaluated, the overall restoration would be of better quality.

Thus, the immediate and anticipated uses and/or commercial applicability of the systems and methods described herein are numerous. In an embodiment, systems and methods can include optical character recognition systems and methods used for text recognition in document scanning applications. In another embodiment, systems and methods can include automated license plate tracking video surveillance systems and methods to identify traffic scofflaws or criminal offenders. In another embodiment, systems and methods can include text restoration systems and methods for text restoration of image data from low resolution CCD devices such as those used in surveillance.

While this invention has been particularly shown and described with references to preferred embodiments thereof, it will be understood to those skilled in the art that various changes in form and details may be made herein without departing from the spirit and scope of the invention as defined in the appended claims.

What is claimed is:

1. A system that extracts text from an image, comprising:
   a capture device that captures the image having a low resolution;

an image segmentation subsystem that partitions the image into image segments;

an image restoration subsystem that generates a resolution-expanded image from the image segments and that negates degradation effects of the low-resolution image by transforming the image segments from a first domain to a second domain and deconvolving the transformed image segments in the second domain to determine parameters of the low-resolution image; and a text recognition subsystem that transforms the restored image data into computer readable text data based on the determined parameters.

2. The system of claim 1, wherein the image segmentation subsystem identifies text from the image segments.

3. The system of claim 1, wherein the image restoration subsystem negates the degradation effects of the low-resolution image by negating distorting effects of defocus and CCD senor point spread function, 4. The system of claim 3, wherein the degradation of the low-resolution image is modeled by a defocus process and a low-resolution process.

5. The system of claim 1, wherein the capture device comprises a charge-coupled device.

6. The system of claim 1, wherein the image restoration subsystem includes a blind image restoration system.

7. The system of claim 6, wherein the blind image restoration system applies an iterative blind deconvolution (IBD) framework.

8. The system of claim 1, wherein the image restoration subsystem includes a Radon transform that transforms the image segments from the first domain to the second domain.

9. The system of claim 8, wherein the second domain is a Radon domain and the first domain is an image domain.

10. The system of claim 9, wherein the image restoration subsystem performs a de-averaging operation in the Radon domain to negate the degradation effects.

11. The system of claim 10, wherein the de-averaging operation is performed in a Radon domain.

12. The system of claim 8, wherein the image restoration subsystem includes an inverse Radon transform that transforms the image segments from the second domain to the first domain.

13. The system of claim 1, wherein the determined parameters of the low-resolution image are deconvolved by applying a Mutual Information Minimization (MIM)-based model.

14. The system of claim 13, wherein the image restoration subsystem performs a de-blurring operation to negate the degradation effects using the Mutual Information Minimization (MIM)-based model.

15. The system of claim 1, wherein the image segmentation subsystem identifies image segments that do not correspond to Whole characters by conforming with a holistic character recognition technique.

16. The system of claim 1, wherein the system restores images of non-cursive text.

17. A system that expands the resolution of a text image, comprising: a text segmentation subsystem that partitions the text image into characters; and a restoration subsystem comprising:

a first transform subsystem that transforms the partitioned text image from an image domain into a Radon domain;

an interpolator that linearly interpolates each column of the Radon domain image;

a first deconvolution subsystem that deconvolves each column to estimate first parameters of the text image;

an image expander that forms an expanded Radon domain image;

a second transform subsystem that transforms the expanded Radon domain image into the image domain;

an image slicer that slices the expanded image domain image to enforce a first constraint;

a third transform subsystem that transforms the sliced image from the image domain into the Radon domain;

a second deconvolution subsystem that estimates second parameters of the text image in the Radon domain;

a fourth transform subsystem that transforms the expanded Radon domain image including the second parameters into the image domain; and an output that outputs the expanded image domain image as a restored text image.

18. The system of claim 17, wherein the first constraint is that the test image is bimodal.

19. The system of claim 17, wherein each column is deconvolved using estimated information in an assumed Gaussian channel.

20. The system of claim 17, wherein the expanded text image is stored, and wherein the second parameters are used as a prior estimate for a next text image.

21. The system of claim 17, wherein the system restores images of non-cursive text.

* * * * *